United States Patent [19]

Cox et al.

[11] 4,387,427
[45] Jun. 7, 1983

[54] HARDWARE SCHEDULER/DISPATCHER FOR DATA PROCESSING SYSTEM

[75] Inventors: George W. Cox, Portland; Justin R. Rattner, Aloha, both of Oreg.

[73] Assignee: Intel Corporation, Santa Clara, Calif.

[21] Appl. No.: 197,655

[22] Filed: Oct. 16, 1980

Related U.S. Application Data

[63] Continuation of Ser. No. 972,008, Dec. 21, 1978, abandoned.

[51] Int. Cl.³ .............................................. G06F 15/16
[52] U.S. Cl. .................................................. 364/200
[58] Field of Search .................. 364/200 MS File, 300

[56] References Cited

U.S. PATENT DOCUMENTS

| | | | |
|---|---|---|---|
| 4,015,242 | 3/1977 | Anceau et al. | 364/200 |
| 4,073,005 | 2/1978 | Parkin | 364/200 |
| 4,214,305 | 6/1980 | Tokita et al. | 364/200 |

*Primary Examiner*—Raulfe B. Zache
*Attorney, Agent, or Firm*—Owen L. Lamb

[57] ABSTRACT

A general-purpose, tightly-coupled multiprocessing system wherein processors share a common memory. A hardware-recognizable object (a process object) in memory stores access descriptors for controlling the type and extent of access to objects associated with a process, including one describing a buffered port. Another hardware-recognizable object (a processor object) associated with an executing process, stores access descriptors for controlling the type and extent of access to objects associated with a processor, including one describing a dispatching port. Task-dispatching functions are accomplished by hardware-controlled queuing mechanisms at the buffered ports and dispatching ports. These mechanisms allow different processes to communicate with each other and bind ready-to-run processes with available processors for execution.

16 Claims, 3 Drawing Figures

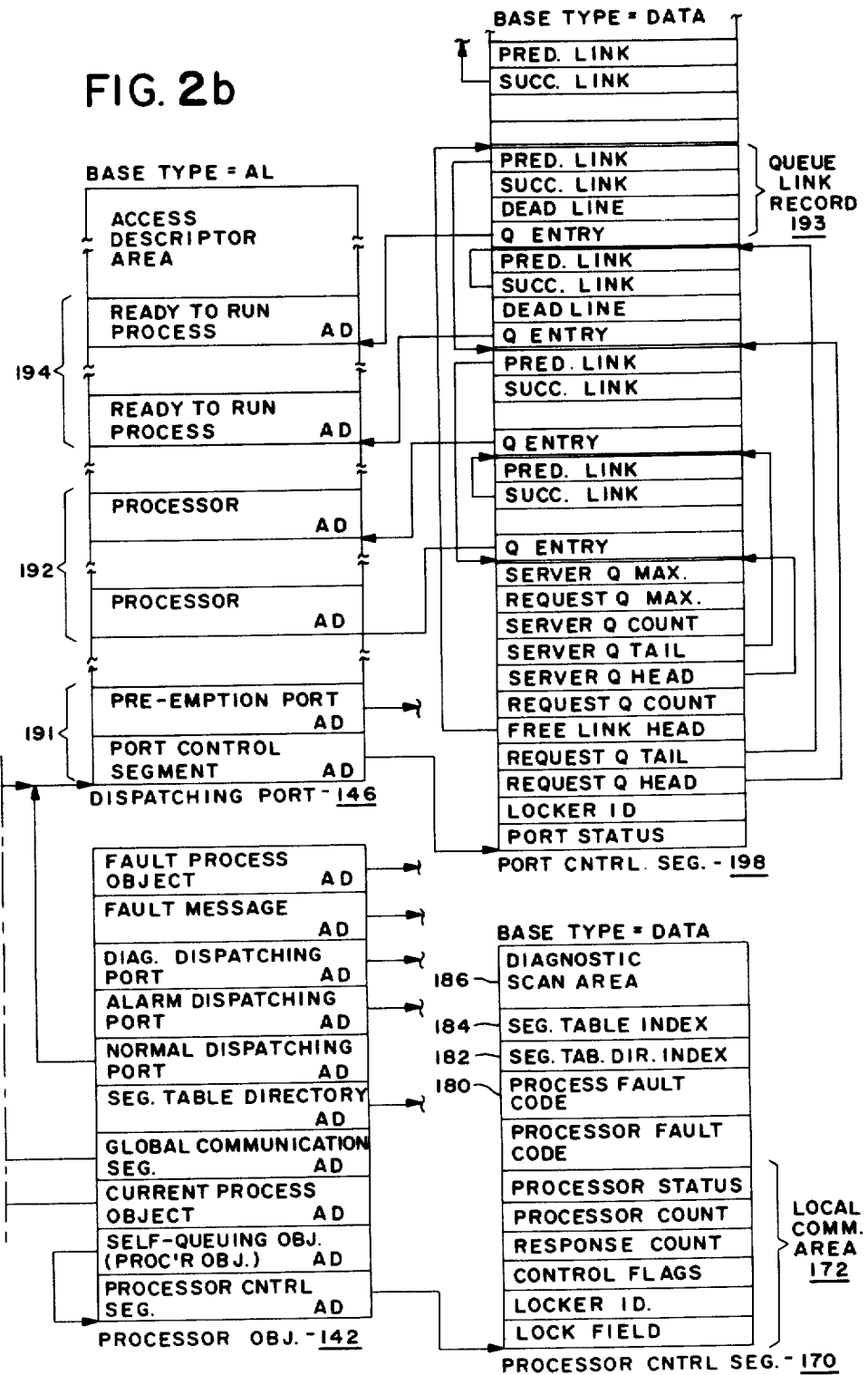

HARDWARE SCHEDULER/DISPATCHER FOR DATA PROCESSING SYSTEM

This application is a continuation of application Ser. No. 972,008, filed 12/21/78, now abandoned.

BACKGROUND OF THE INVENTION

1. Field of the Invention

The invention relates to data processing systems, and more particularly to the scheduling and dispatching of processes in multiprocessing systems.

2. Description of the Prior Art

A multiprocessing system is able to execute simultaneously two or more computer programs or sequences of instructions. In a tightly-coupled multiprocessing system several processors may be connected to a single, shared memory. These systems multiplex numerous concurrent functions or tasks on one or more of the processors. Facilities must be provided for assigning available processors to tasks which are ready to be executed. Prior approaches have included software, firmware, and hardware types of systems.

Of the prior software techniques, there are the master-slave types of systems wherein one processor performs executive functions to allocate tasks to the other processors in the system (Mellen et al. U.S. Pat. No. 3,530,438 and Barbour U.S. Pat. No. 3,984,817).

There are also systems that utilize identical processors wherein none of them take on the role of the master. These systems utilize a central control wherein the software for task assignment is stored in memory (Driscoll U.S. Pat. No. 3,496,551 and Ochsner U.S. Pat. No. 3,348,210). Finally there are those systems wherein a special instruction is provided for implementing task assignment in each processor (Podvin U.S. Pat. No. 3,614,745 and Clark U.S. Pat. No. 3,725,864).

Techniques utilizing firmware use special-purpose microprogrammed controllers to perform the scheduling and dispatching functions. (Nadir U.S. Pat. No. 4,011,545, Valassis et al. U.S. Pat. No. 3,959,775, Tucker U.S. Pat. No. 3,449,722, Anceau et al. U.S. Pat. No. 4,015,242 and Brown U.S. Pat. No. 3,896,418).

None of the prior art data processing systems take full advantage of recent advances in the state-of-the-art of very large-scale, integrated circuit technology. Accordingly, the performance of these prior systems is low and programming to support multiprocessing is very complex.

With respect to the prior software techniques, while they are capable of performing complex multiprocessing operations, they suffer from the high costs of control programming to support these operations. The firmware techniques, while reducing somewhat the programming costs of the software techniques, lack flexibility, and lack general-purpose application.

The hardware techniques of the prior art also lack flexibility because they are able to handle only synchronous types of operations. They also lack the necessary hardware mechanisms to effectively communicate between various asynchronous operations without resort to costly control-program support for such operations, for example, interrupts at the processor level.

It is therefore a primary object of the present invention to provide a process scheduling and dispatching apparatus which is fast and economical, and which is designed to efficiently utilize very large-scale, integrated circuit technology.

It is also an object of this invention to provide a hardware mechanism for the isolation of and communication between tasks multiplexed to run concurrently on one or more processors, and to provide for facilities to automatically assign available processors to ready-to-run tasks.

BRIEF SUMMARY OF THE INVENTION

Briefly, the above objects are accomplished in accordance with the invention by creating and storing in memory a hardware-recognizable object, a process object, which stores access descriptors for controlling the type and extent of access to objects, including a buffered port, associated with the process.

Another hardware-recognizable object, a processor object, stores access descriptors for objects associated with a processor, including a dispatching port.

The buffered port is responsive to a currently running process and provides the means for communicating a message to another process. The buffered port includes dual-purpose queuing means for (1) queuing messages which have been sent for service by a process and (2) for queuing processes that are waiting to service a message.

The dispatching port is responsive to the buffered port means for effecting the dispatching of ready-to-run processes for execution by a processor. The dispatching port includes two separate queuing means: a request queue for queuing processes sent by the buffered port for execution, and a server queue for queuing processors that are available to receive a process for execution thereof.

In accordance with an aspect of the invention, means capable of being activated by a process are provided for selectively queuing a process at either the buffered port or the dispatch port, so that a process may be selectively communicated for service by either a processor or another process, whereby additional process interpretation may be interposed prior to the execution of a process by a processor.

In accordance with a further aspect of the invention, a value called a "deadline" is used in a dispatching port. This value is generated by a processor when it enqueues a process at a dispatching port, the process with the nearest deadline being placed at the head of the request queue. The processes on the request queue are thus ordered in priority by increasing deadlines. Since processors always remove processes from the head of the request queue the processes with the nearest deadlines are served first. Means are also provided whereby a process may queue itself for execution at some future time. In the event an idle processor is queued at a dispatching port, it automatically reschedules itself to the process at the future time.

The present invention has the advantage that the need for a control program is eliminated by providing the hardware dispatching port mechanism by which a processor is able to perform a self-queuing function and thus wait at a dispatching port until a process to be executed arrives. By providing the mechanism by which processors can perform self-queuing the need for the extensive software inherent in the prior software techniques is eliminated.

The present invention utilizes a process control segment which contains fields of information called the delay period and the service period. This has the advantage of allowing processors to automatically control distribution of system resources in accordance with policies initially set through software.

The present invention has the advantage over prior synchronous types of multiprocessor systems of being able to handle simultaneous synchronous or asynchronous operations by means of the unique buffered ports and dispatching ports.

The invention has the further advantage that the number of processors may be increased to obtain higher performance without having to provide new software for each new configuration. This is possible because each processor automatically assigns itself to a ready process or will wait for a process to be made ready by the activity on some other processor.

Finally, the present invention with its system of hardware buffered ports and dispatching ports relies on information theory design principles which results in maximum efficiency.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein:

FIGS. 2A and 2B, taken together, are a block diagram of system objects supporting interprocess communication, scheduling and dispatching of processes; and interprocessor communication, shown in FIG. 1.

TABLE OF CONTENTS

Background of the Invention
Brief Summary of the Invention
Brief Description of the Drawings
Table of Contents
Introductory Description of the Invention
  Object Creation, Addressing and Typing
  Individual Process Environment
  Intercontext Communication
  Interprocess Communication
  Dispatching Mechanism
  Interprocessor Communication
  Processor Types
Detailed Description
  1.0 Processes
  1.1 Process Objects
    1.1.1 Process Control Segments
    1.1.2 Current Service and Buffered Ports
    1.1.3 Trace, Notification, and Fault-Buffered Ports
  1.2 Buffered Communication Ports
    1.2.1 Buffered Port-Control Segment
    1.2.2 Service Ports
  2.0 Processors
  2.1 Processor Objects
    2.1.1 Processor Self-Queuing
    2.1.2 Processor Control Segments
      2.1.2.1 Interprocessor Messages
    2.1.3 Global Communication Segments
    2.1.4 Current Process Objects
    2.1.5 Alarm Dispatching Ports
    2.1.6 Diagnostic Dispatching Ports
  2.2 Dispatching Ports
    2.2.1 Dispatching Port Control Segment
    2.2.2 Request-and-Service Queues
    2.2.3 Deadlines
    2.2.4 Preemption Ports
  3.0 Process-to-Process Communication
  3.1 Process Parameter Transmission
  3.2 Process Resumption/Suspension
  3.3 Buffered Communication Ports and Dispatching Ports
    3.3.1 Buffered Communication Ports
    3.3.2 Dispatching Ports
  4.0 Processor-to-Processor Communication
  4.1 Interprocessor Communication Protocol
  5.0 Process Communication Operators

INTRODUCTORY DESCRIPTION OF THE INVENTION

Figure 1:
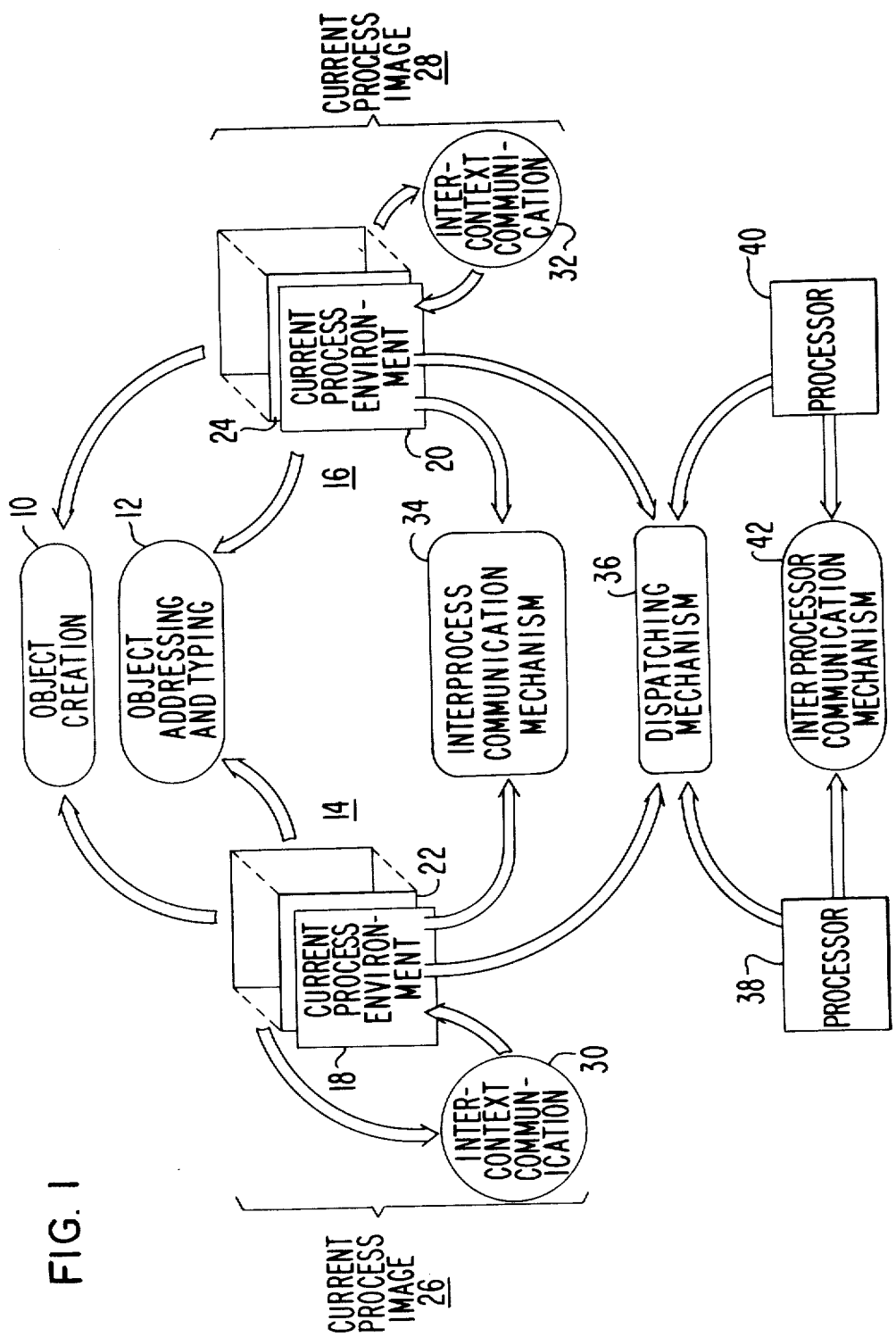
FIG. 1 is a functional block diagram illustrating the various components of a data processing system embodying the invention.

Referring now to FIG. 1, the following introductory description broadly describes the various elements of the system in which the invention is embodied and provides an introduction to some of the terminology used throughout the following specification. The overall system is more fully described in U.S. Pat. No. 4,325,120, entitled "Data Processing System," by Stephen R. Colley, et al. granted on Apr. 13, 1982, which is incorporated herein by this reference. FIG. 1 illustrates the various agents in the system and the mechanisms that they utilize. Arrows in the figure denote the following. The agent is located at the source of the arrow and the mechanism that the agent is using is located at the destination of the arrow. Two kinds of agents are shown, processes that are in a particular state, and the processors that the processes are executed on.

OBJECT CREATION, ADDRESSING AND TYPING

All memory references within the system reference what are called objects. There are two types of objects: data segments and acesss lists. Access lists are used in reference development and data segments are used to contain data scalar values.

The system provides an object creation mechanism (10) in hardware for supporting object creation dynamically. This mechanism is based upon a particular kind of object called a storage resource object, which describes the various areas of physical memory that are not currently allocated. By utilizing a specific set of hardware-supported algorithms, the mechanism performs, upon request, the allocation of data segments of either one of the two basic object types. Once objects have been created, a given process running on a given processor generates references through those objects. These references are mapped or developed into physical addresses for the main memory by means of a mechanism called the object addressing, protection and typing mechanism (12). This mechanism provides the means by which any one reference to an object will develop a physical address from that reference. This object addressing mechanism makes use of what is called an access path to the object. For example, in a simple case the access path is comprised of three levels. The first level employed in the development of the address is an object that is called an access descriptor. It describes the kind of access that the user of the access descriptor has to the object at the base of the access path. An access descriptor describes the kind of rights, for example, read rights or write-rights, which define various kinds of systems rights (depending upon the type of the object) that the holder of the access descriptor has for that object.

At the next level down the path from the object for which the reference was generated and the address developed, there are segment descriptors. The system employs a two-level segmented addressing space. That is, there are two levels of segment tables. The highest level segment table is called a segment table directory. In it are found segment descriptors for segment tables. Any reference contains two components when selecting the segment descriptor to use in the address development. The first reference selects from the segment table directory the segment table in which the final segment descriptor should be found. The second reference selects out of that segment table the segment descriptor for the segment in question.

The segment descriptor for the object for which addresses are being developed contains information which locates that object in a physical memory, gives its length, gives various typing information about the object, and includes various memory management information (such as the count of the number of ways of access to this object, information about whether the segment had been altered or referenced, etc.).

INDIVIDUAL PROCESS ENVIRONMENT

Various process environments (14) and (16) are shown in FIG. 1. The current process environment (18, 20) is shown at the front and the past history (22, 24) (process environments that are not currently invoked) is shown toward the back of the drawing. The instantaneous state of these process environments is illustrated and referred to as the current process image (26, 28). As described above, a process running on a processor generates references which the processor translates into a physical address using the object addressing, protection, and typing mechanism. A term utilized throughout this specification is a context. A context is an environment in which a particular operation can be executed. Over a period of time a process which is the site for potential or parallel activity, may move between contexts in its execution.

This context environment in the present system has four components. These four components are four access lists containing access descriptors. Given the sum total of the access descriptors in this environment one can tell exactly what kind of access that environment provides to the various objects for which there are access descriptors.

INTERCONTEXT COMMUNICATION

Each one of the contexts as a minimum must contain access descriptors for all of those objects that the operation in that environment can access. One operation may need over a period of time to call another operation in order to support modular programming. Since the second operation may not be defined to work or operate in the same environment as the first operation, a mechanism is provided for transferring control from one environment (and the operation in it) to an operation in another environment. This mechanism is called the intercontext communication mechanism (30, 32 in FIG. 1). There are two kinds of intercontext communication. One kind supports downward call/upward return or call/return kinds of control transitions. The second kind is called nonhierarchical communication or coroutine communication. This kind of communication supports the hierarchical or asynchronous kinds of communication between contexts supported by the call/return mechanisms; and supports synchronous control flow patterns, such as encountered among coroutines. The program environments called contexts are retentive in nature. That is, they are not necessarily created immediately prior to or part of control flow entering them, and they are not immediately destroyed after or as part of control flow exiting from them. They have a longer lifetime than merely the control flow patterns that use them or traverse through them.

Contexts have a static component and a dynamic component. The static component of any context is made up of a two-component object called a domain. A domain refers to the domain of definition of the operation which is to execute within that context. The two components of a domain consist of a public access list and a private access list. This partitioning allows the context to support the kinds of semantics called for by certain modern programming languages. All the operations on a given extended type are made available via the public access list, and data hiding or object hiding is accomplished by means of the private access list.

The dynamic component of any context is called the context access list. The context access list is an instance-specific version of dynamic access descriptor working space. It is within this space that an instance of a particular working operation within a given domain of definition does its dynamic work.

Another component which is dynamically selectable by a given context is what is called an entry access list. Any access list, for which the operation in a given context bears appropriate rights, can be selected and made a part of the current access environment by means of the entry access list.

INTERPROCESS COMMUNICATION

Two processes may need to communicate with each other but are scheduled and thus run in an asynchronous manner on one or more processors. A buffering mechanism, called the interprocess communication mechanism (34), is provided such that the timing differences between the two processes can be accommodated. Interprocess communication is supported by means of a hardware-recognizable object called a buffered communication port. The buffered communication port is a queueing mechanism wherein messages which one process wants to send to another process are queued and wherein processes which are waiting to receive a message are queued. These ports with their queueing ability thus provide the buffering needed to smooth out the asynchronous behavior of the two processes.

DISPATCHING MECHANISM

Once a message and a process are bound together at a buffered port, the bound pair is ready to run on one of a number of available processors (38, 40). The dispatching mechanism (36) provides a way for the message/process pair to be scheduled on a processor. The dispatching mechanism is a hardware mechanism which automatically does the scheduling and dispatching of ready-to-run processes in accordance with previously set software parameters. In this way the dispatching mechanism enforces a previously specified software scheduling policy or low-level scheduling policy on all of the processes within the system. If one were to simply bind a process to a processor with no control over how long that process should be bound to the processor, then that process would run through completion on that processor. If the process were one that was never ending, the processor would be bound to that process forever. The dispatching mechanism is provided so that software may specify how the processes are multiplexed over time with respect to the processors. The dispatching mechanism does not support preemptive forms of scheduling policies, but does support a family of what is referred to as relative-frequency scheduling policies. Two values are provided with every process when it is being queued at a dispatching port. The first is its maximum allowable delay and the second its maximum allowable service quantum. Using these two values, a range of relative-frequency based software scheduling policies are achieved from round robin to pure relative frequency.

Service period information is provided so that when a processor removes a process from a process queue or from a request queue in a dispatching port, the processor can tell how long software desires that this process be bound to the processor. This ensures that there are no runaway processes that tie-up a processor forever. After a service period is over, the bond between a process and the processor is broken which forces the dispatching mechanism to allow other processes to be bound to a processor.

INTERPROCESSOR COMMUNICATION

As previously described, the buffered port mechanism is utilized to bind a message to a process and the dispatching mechanism is utilized to bind the process to an available processor. The processor with the message/process pair examines the appropriate dispatching port. If no processor is queued at that port, then the message/process pair is queued at the port to wait for an available procsssor. If there is a processor queued at the dispatching port awaiting the arrival of a service request (a message/process pair), then the processor that sent the message can bind the service request to the waiting processor. The interprocessor communication mechanism (42) is the means by which the requesting processor communicates to the waiting processor that it can in fact begin executing the process which has been bound to it.

The interprocessor communication mechanism is also used to allow software running on one processor to ask another processor to perform certain diagnostic functions, such as performance of an initialization sequence, an alarm sequence, or a reset sequence. This allows the debugging of a processor within the system while the system is running.

Another use of the interprocessor communication mechanism is to communicate with a specific processor or broadcast to all processors within this system to thereby inform them that they should requalify certain information maintained on the processor about the address development mechanism.

The interprocessor communication mechanism is also used to support recovery from processors which have malfunctioned by causing these processors to stop functioning. The mechanism also supports reconfiguration so that processors can be inserted and removed from the system dynamically.

The interprocessor communication mechanism is structured as follows. Each processor has associated with it a local communications segment, stored in a common memory. The local communication segment is for processor-specific communication. Another segment, the global communication segment, is common to all processors, and is for system-wide communication.

Each communication segment has a field containing control flags. The flags are set by one processor and later inspected by another processor. The inspecting processor is instructed to perform a number of functions specified by the state of the control flags. A count field and a lock field are provided in all communication segments to interlock access to the communication mechanism.

PROCESSOR TYPES

There are two types of processors, Generalized Data Processors (GDP) and I/O Processors (IOP). A GDP functions within an address space and can only reference objects that are within that space. An IOP is able to reference objects in two different spaces and functions on the boundary between these two address spaces. The first address space is the same address space that the GDP uses. The other address space that any particular IOP uses is called an IO address space and is separate and does not intersect the GDP address space, i.e., the address spaces share no common addresses.

The main purpose of a GDP is to perform generalized computation over a wide spectrum of data types supported by this type of processor. The function of an IOP is more restricted with respect to the number of data types supported. The main purpose of an IOP is to transfer data between the two address spaces that it has access to and can reference. An example would be the transferring of data from an input device which exists in in the I/O address space, into a data segment which exists in the GDP address space. Conversely data is transferred from a data segment in the GDP address space to an output device which exists in the I/O address space.

An IOP uses the same descriptor-controlled segment-based address development mechanism as the GDP. The I/O operations also execute in a context-based environment similar to that provided for the GDP. An IOP uses the same interprocess communication mechanism and IOPs are selected for service via a dispatching mechanism which is similar to that described above. A similar interprocessor communication mechanism is utilized.

A different addressing mechanism must be employed for an IOP because there must be some way to tell that a segment being referenced is an I/O address space or is a GDP address space. There are also special considerations in referencing segments such as timing considerations dealing with a specific kind of device.

Special hardware is provided in an IOP to improve the performance of data transfer operations. This makes it possible to transfer blocks of data.

An IOP will pick a process from a different dispatching port than a GDP. This avoids the necessity of having to examine processors queued at a particular dispatching port to find one of the correct type, i.e., a GDP or an IOP. To simplify the mechanism, all of the GDPs in a system dispatch processes from one dispatching port. On the other hand, an IOP uses a different dispatching port, and not all of them have access to the same port. This is because not all of the IOPs have access to all I/O devices. Therefore, not all I/O processes, if they are to serve only their particular device, can be associated with any IOP. In general, out of a set of IOPs there will only be some small number which will have access to any particular I/O address space. For example, the number might be as small as one IOP to one peripheral device. On the other hand it can also be the case that several IOPs will service several peripheral devices on one I/O bus which serves as one I/O address space. For this reason the mating of I/O processors to dispatching ports for I/O processes is as follows. All the IOPs that have access to one I/O address space (when in normal dispatching state) will dispatch I/O processes from one input/output process dispatching port.

DETAILED DESCRIPTION

1.0 PROCESSES

A process is an environment in which execution by a processor can occur. On the present multiprocessing system several of these environments can exist at one time. Execution can occur simultaneously, on separate processors, of several processes.

1.1 PROCESS OBJECTS

Figure 2A:
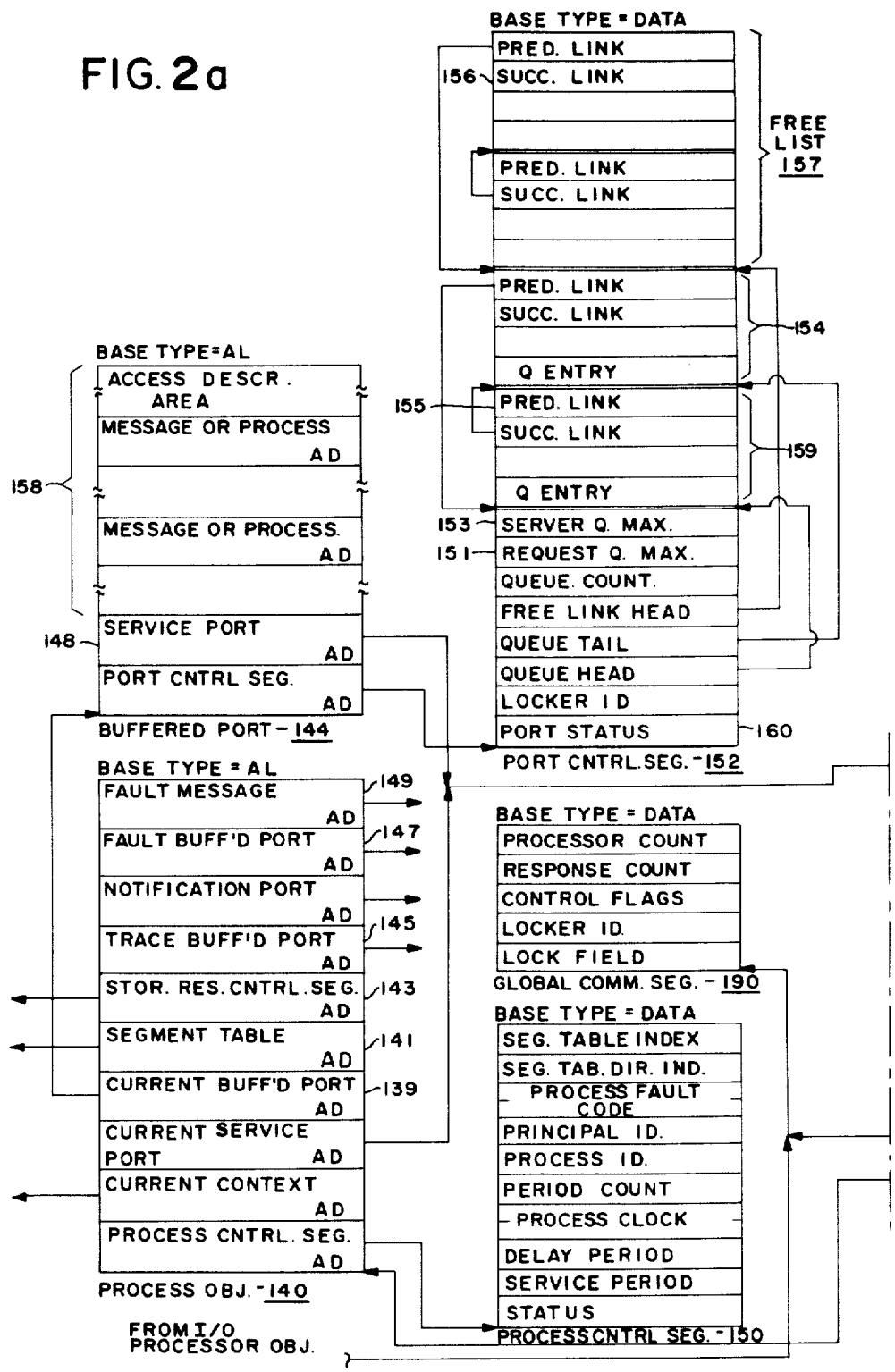

Each process is represented in the system by a process object (140) shown in FIG. 2A. The process object is an access list wherein the access descriptors describe other system objects associated with a process environment. Those objects necessary for an understanding of the present invention are described herein. For a description of the other objects, reference should be made to the heading "SYSTEM OBJECT STRUCTURES" in the above-referenced Colley, et al. patent application.

1.1.1 PROCESS CONTROL SEGMENTS

The process control segment (150), FIG. 2A, accessible via the first entry in a process object (140), contains several fields of information that assist in both the automatic and program-controlled distribution of system resources. It also contains fields for recording both process state and fault information.

The first double byte (160) in the process control segment contains process status information that is otherwise not found in any of the segments associated with a process. In particular, it specifies the state of certain internal processor flags at the moment execution of the process last ceased. Finally, it contains the state of the process itself, such as whether it is running or waiting for a processor.

In order to force a process to wait for maintenance, a maintenance request flag is available in the process status field. When in the normal course of inspecting or loading process status information, a processor finds this flag to be set, the associated process is placed in the waiting for maintenance state and sent immediately to the preemption port of the current service port for software maintenance. No further attempt to execute the process is made. The interpretation of the process state subfield is as follows:

000—running
001—010—reserved
011—waiting for trace
100—waiting for message
101—waiting for processor
110—waiting for service
111—waiting for maintenance The interpretation of the trace made subfield is as follows:

00—normal mode
01—fault trace mode
10—flow trace mode
11—full trace mode

The two short ordinal values, called the *delay period* and the *service period*, allow processors to automatically enforce software-defined processor resource allocation policies. When set by the appropriate processor scheduling software, they specify to a processor when and for how long a given process should be executed. The short ordinal value called the *period count* is used by processors to tell how many service periods a given process should receive prior to being rescheduled by software. The exact method used by processors to make this determination is described under the heading "Access Environment Manipulation And Communication" in the above-referenced Colley, et al. application. Processors also assist scheduling software in the accurate measurement of the total processing time given to a process, by maintaining a *process clock* field in the process control segment. After each period of service a process receives, the executing processor adds the duration of the service period to the ordinal value in the process clock field. The field is initialized to zero by software at the time the process is created. The process clock may be read at any time by a process.

1.1.2 Current Service and Buffered Ports

In certain situations, it is essential for hardware to record for later use by both hardware and software, the identity of the last port used for process service. This information is found in the third entry of its process object and is updated each time an access descriptor for the process is sent to a service port. In most cases, the current service port is simply the dispatching port last used to pair the process with a processor. Occasionally, it is a buffered port for a sofware service process such as a medium-term processor scheduler or other resource manager.

For similar reasons, the hardware also records the identity of the last buffered port used to pair the process with a message. This information is found in the fourth entry of its process object and is updated each time the process receives a message via a buffered port or an access descriptor for the process object is enqueued at a buffered port.

1.1.3 Trace, Notification, and Fault-Buffered Ports

Whenever a process is in tracing mode and a tracing event occurs, the process is suspended and sent as a message to a service process for inspection and/or possible alteration. The port at which the service process waits is called the trace buffered port.

1.2 BUFFERED COMMUNICATION PORTS

Processes communicate with one another by sending and receiving messages, in the form of access descriptors, at system objects called buffered communication ports (144), FIG. 2A. Conceptually, a buffered port contains two queues. The first queue is called the *request queue* and holds the access descriptors for messages that have been sent, but not yet received. The second queue is called the *server queue* and holds the process object access descriptors for processes that have been suspended pending the arrival of a message.

Since it is impossible for descriptors of both types to be enqueued at the same time, a buffered port physically contains only one queue (158). Status information found in the port indicates whether the physical queue is currently a server queue, a request queue, or simply empty.

Buffered ports are accessed via buffered port access descriptors (e.g., 139). The base rights field for a buffered port access descriptor is interpreted in the same manner as for all objects of base type access list. The system rights field for a buffered port access descriptor is interpreted as follows:

00—messages may be sent or received via this port
01—messages may be sent via this port 10—messages may be received via this port
11—messages may neither be sent nor received via this port.

The following describes the other components of a port in detail.

1.2.1 Buffered Port Control Segment

The two logical queues of a buffered port are defined by the hardware-recognized data structures of its port control segment (152). The first eight double bytes of the segment control queue status and control information while the remainder of the segment contains a dynamically allocated area for QUEUE LINK RECORDS. The first double byte (160) of the port control segment contains the port status field. The information in this field, as shown below, indicates the presence or absence of queued descriptors of either type.

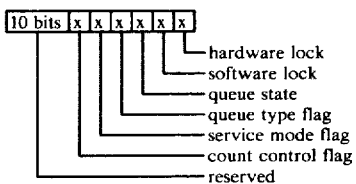

The port locks are used to give one processor or one process exclusive access to the port during insertion or removal operations. When the port is locked by a processor, the second double byte of the port control segment (152) contains the locking processor's identification value. When the port is locked by a process, the second double byte contains the locking process's identification value.

The use of the service mode flag is described in section 1.2.2 below.

The third and fourth double bytes of the port control segment (152) contain short ordinals whose values are byte displacements to the lowest addressed bytes of the first and last queue link records of the current queue, respectively. The sixth double byte contains the count of queue elements when either of the queues is occupied.

To assist software in the management of the port, two maximum count values can be maintained by the hardware during insertion operations. The count control flag indicates whether or not queue length monitoring is to be done. A value of zero indicates that queue length monitoring is to be done. A value of one indicates that queue length monitoring is not to be done. The count control flag can be used to allow performance improvements in systems where queue length monitoring is not desired or necessary. Depending on the queue, if the count control flag is not set, the appropriate maximum count field is checked and updated if necessary.

A list of free queue link records is created when the queue is initialized by software. The head of this list is a short ordinal value found in the fifth double byte of the port control segment. It contains a byte displacement to the lowest addressed byte of the first queue link record in the free list.

The location of a descriptor in the access descriptor area and its arrival order in the corresponding queue is given by a queue link record. The structure of such a record is shown in FIG. 2A (e.g. 159).

The successor link (156) and predecessor link (155) are short ordinals containing the byte displacement to the lowest addressed byte of a queue link record for a previously or subsequently enqueued descriptor, respectively. A zero displacement signifies that no record is linked. This only occurs in the predecessor link of the first queue link record and the successor link of the last queue link record of a queue. The queue entry field is a short ordinal specifying the access list entry member of the associated access descriptor in the access descriptor area. The second double byte of the queue link is reserved for future use by the port queuing mechanism.

The strategy for queue element insertion and deletion at a buffered port is first-in, first-out. Each time an access descriptor is inserted on a queue at the port, a new queue link record is removed from the free list (157). The access descriptor is stored at the entry specified by the head queue link record, and the record is linked on at the tail of the queue. Each time an element is removed from a queue, the head queue link record specifies the location of the associated access descriptor. The head queue link is then removed from the queue and returned to the free list.

The base rights field of a buffered port control segment access descriptor is interpreted in the same manner as for all segments of base type data segment. The system rights field is uninterpreted.

1.2.2 Service Ports

When a waiting process is paired with an arriving message, the process access descriptor for that process is removed from the server queue and sent, as a message, to the port specified by the second entry (148) in the port object (144). This service port may be another buffered port or a dispatching port. In the latter case the process will soon be accepted for execution.

Should a process not have to wait to receive a message at a buffered port (i.e., a message was already queued there), it continues to execute unless its current service port access descriptor (third entry of process object 140) is different from the service port access descriptor in the port. If it is different, the process is suspended and its process object access descriptor is sent to the service port as described above.

In certain buffered port applications, it is often desirable to send a process to its current service port, as specified in its process object, instead of sending it to the port-specified service port (148). This mode of operation is obtained when the service mode flag in the port status field is set to one.

2.0 PROCESSORS

Processors recognize a variety of system objects in order to enhance performance and reduce programming complexity. While most of these objects are of considerable use and advantage in general programming situations, a few have been defined to assist principally in the management and control of the processors themselves. The key facility these special objects provide is one of processor selectivity. Through their coordinated use, processors can be assigned to serve processes on as narrow or as broad a basis as is necessary.

2.1 PROCESSOR OBJECTS

Before a processor can begin normal operation, it must establish physical addressability to serveral different system objects. Foremost among these is the segment table directory which will enable the processor to translate the logical addresses it normally encounters in instructions into their corresponding physical addresses. Initial access to a segment table directory is achieved by a processor simply assuming the existence of a temporary segment table directory at physical address zero.

Having established itself in a logical address space, via the temporary segment table directory, a processor is ready to locate a ready-to-run process. Such processes, however, are found at dispatching ports, and the processor has yet to be assigned to a specific one. Although another default mechanism could be used (i.e., a temporary dispatching port), the system employs a system object for each processor wherein they locate their *normal dispatching ports* via logical, rather than physical addresses. At initialization or reset, each processor loads its own unique, hardwired (i.e., physically connected) processor unit number into an internal register. That number is then used as a segment descriptor index into the temporary segment table directory. At the physical address specified by the selected segment descriptor, each processor finds its own processor object. This is the system object used to establish the processor's accessibility to its normal dispatching port and to a number of other system objects it will need for proper operation. The port descriptor for the normal dispatching port of a processor is found, as shown in FIG. 2B, in the sixth entry of its processor object (142).

The other objects necessary for an understanding of the present invention referenced by a processor object are functionally described in the following subsections.

2.1.1 Processor Self-Queuing

Whenever a processor is unable to find a ready-to-run process at a dispatching port, 146, (described in section 2.2) the event is recorded by placing an access descriptor for its processor object on the server queue of that port. To simplify the generation of the descriptor, the second entry of each processor object contains an access descriptor for the processor object itself. Whenever circumstances cause the processor to enqueue itself and go idle, it simply copies this descriptor into the appropriate queue position at the port.

The base rights field for a processor object access descriptor is interpreted in the same manner as for all objects of base-type access list. The system rights field for a processor object access descriptor is interpreted as follows:

00—an interprocessor message may be broadcast via the global communication segment of this processor object, or it may be sent to this processor via the processor control segment of this processor object 01—an interprocessor message may be broadcast via the global communication segment of this processor object 10—an interprocessor message may be sent to this processor via the processor control segment of this processor object 11—no interprocessor messages may be sent to this processor object.

These two types of interprocessor communication are described in the following two subsections.

2.1.2 Processor Control Segments

A processor is able to receive information directed to it from other processors by inspecting, when requested, the contents of an area called the local communication area in its processor control segment. This segment, which is unique to each processor, is accessed via the first access descriptor in its processor object. In addition to interprocessor communication, the segment is also used to record fault and diagnostic scan information. The information in the processor control segment (170) is organized as shown in FIG. 2B.

In order to interlock the transmission of multiple, simultaneous interprocessor messages, each processor control segment contains a set of lock bits in its first double byte. The format of this lock field is shown below.

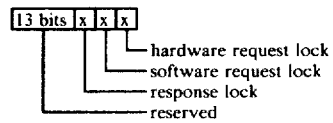

The request locks and the response lock must be clear before transmission begins. At the onset of communication, one of the request locks and the response lock are set. Following the communication, the request lock is cleared, with the response lock left set until the processor carries out the functions requested by the message.

When the port is locked by a processor, the second double byte contains the locking processor's identification value. When the port is locked by a process, the second double byte contains the locking process's identification value.

2.1.2.1 *Interprocessor Messages.* The interprocessor message takes the form of a double byte bit field containing a set of processor control flags. The message is stored in the third double byte of the segment by the sending processor. It has the following organization.

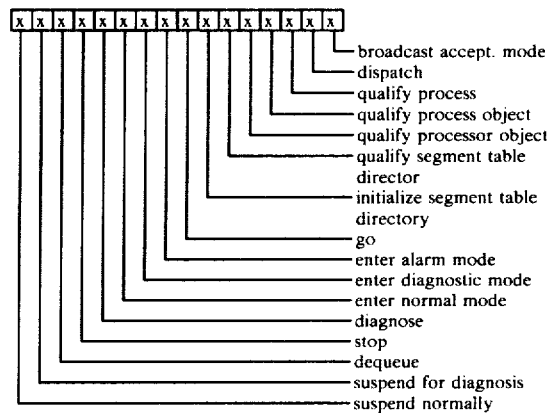

The processor count and response count fields also participate in the message interlock function. At the time a message is sent, the sending processor initializes the response count to the processor count value. When the processor completes the requested function, it decrements the response count and tests the new value for zero. If the decremented value is zero, the processor clears the response lock. Normally, the processor count value in a processor control segment will be initialized to one.

Another double byte bit field is present in each processor control segment. This field contains status information about the associated processor. Included in the processor status field, as shown below, are subfields describing the processor state, dispatching state, and type.

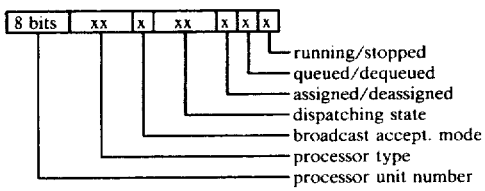

The processor unit number is the value loaded into the processor at initialization or reset.

The running/stopped bit is interpreted as follows:
0—running
1—stopped

The queued/dequeued bit is interpreted as follows:
0—not queued at a dispatching port
1—queued at a dispatching port The assigned/deassigned bit is interpreted as follows:
0—assigned to a process
1—not assigned to a process The dispatching state subfield is interpreted as follows:
00—using normal dispatching port
01—using alarm dispatching port
10—using diagnostic dispatching port
11—reserved The meaning of these states is explained in later sections.

The broadcast acceptance mode bit is interpreted as follows:
0—broadcast interprocessor messages are being accepted and acknowledged
1—broadcast interprocessor messages are not being accepted or acknowledged The processor type subfield is interpreted in the following manner:
00—generalized data processor
01—input/output processor
10—reserved
11—reserved.

All of the subfields in the processor status field are initialized and maintained by the processors themselves.

The diagnostic scan area is used to record information requested via the diagnose function of interprocessor communications.

The base rights field of a processor control segment access descriptor is interpreted in the same manner as for all segments of base type data segment. The system rights field of a processor control segment access descriptor is uninterpreted.

2.1.3 Global Communication Segments

It is often inconvenient to communicate with all of the processors in a system on an individual basis when a message of common interest must be transmitted. For this reason, each processor is given access to a common communication area called the global communication segment via the fourth entry in its processor object. The structure of this segment, as shown at 190, FIG. 2A, is identical to that of the local communication area of a processor control segment, with one exception: a global communication segment does not contain processor status, fault information, or diagnostic scan fields.

The processor count, a short ordinal value, is set by system software to be equal to the total number of processors having access to the segment. As in the case of the processor control segment, the response lock is not cleared until the response count reaches zero. This ensures that all the processors have responded before another message is accepted. The response count is initialized to the processor count value by the sending processor.

The base rights field of a global communication segment access descriptor are interpreted in the same manner as for all segments of base-type data segment. The system rights are uninterpreted.

2.1.4 Current Process Objects

While a processor is executing a process, the third entry of its processor object provides the identity of that process via a process object access descriptor. The presence of this descriptor simplifies several software and hardware functions. For example, it permits system software to determine, without disturbance, which process, if any, a processor is currently executing. On the hardware side, should the processor be forced, at some time, to requalify addressing information that it may be buffering internally while executing the process, the descriptor provides a convenient means for the processor to reestablish addressability after requalification.

The current process object entry is also used to allow other processors to assign a ready-to-run process to a previously-idled processor. Once another processor places the desired process object access descriptor in the current process object entry, it is a simple matter to awaken the idling processor and have it resume execution of the process. Should the processor be forced to suspend the process, the current process object access descriptor is easily copied into the appropriate queue at the specified port.

2.1.5 Alarm Dispatching Ports

Upon the detection of a hardwired alarm signal, a processor will suspend any process that it may currently be executing and enter the alarm dispatching state. At that point it will begin executing any process it finds queued at the alarm dispatching port specified by the port access descriptor in the seventh entry of its processor object. Processes present at this port are intended to be of extreme priority, such as those that might run in the event of an imminent power failure.

Interprocessor messages can be used to request a processor to either enter or exit the alarm dispatching state.

2.1.6 Diagnostic Dispatching Ports

Should a processor suspect an internal malfunction, it will suspend any process it may currently be executing and enter the diagnostic dispatching state. At that point it will begin executing any processes it finds waiting at the diagnostic dispatching port specified by the eighth entry of its processor object. The processes present at this port are intended to be of the type which will either verify the proper operation of a processor or request that it stop.

Interprocessor messages can be used to request a processor to either enter or exit the diagnostic dispatching state.

2.2 DISPATCHING PORTS

Processors serve processes that are ready for execution by receiving them at dispatching ports in much the same manner as processes serve messages that have been sent to them at buffered communication ports. The differences in dispatching port function are significant enough, however, to require a different hardware-recognized data structure.

Since, with dispatching ports, it is possible for access descriptors of both types (i.e., for processes waiting for execution and for idle processors) to be enqueued at the same time, a dispatching port physically contains two queues. Status information found in the port indicates the state of the associated request and server queues.

A dispatching port is represented by an access list (146) whose organization is shown in FIG. 2B. The rest of the port access list, called the access descriptor area, serves as a temporary repository or buffer for access descriptors queued at the port.

Dispatching ports are accessed via dispatching port access descriptors. The base rights field for a dispatching port access descriptor is interpreted in the same manner as for all objects of base-type access list. The system rights field for a dispatching port access descriptor is interpreted as follows:

00—process objects may be sent to and received from this dispatching port
01—process objects may be sent to this dispatching port
10—process objects may be received from this dispatching port
11—process objects may neither be sent to nor received from this dispatching port.

The following subsections describe the other components of a dispatching port in detail.

2.2.1 Dispatching Port Control Segment

The two queues of a dispatching port are defined by the hardware-recognized data structures of its port control segment. The first eleven double bytes of the segment contain queue status and control information while the remainder of the segment contains a dynamically allocated area for *queue link records*. The overall structure of this segment is shown at 198 in FIG. 2B. The first double byte of the port control segment contains the port status field. The information in this field, as shown below, indicates the presence or absence of queued descriptors of either type.

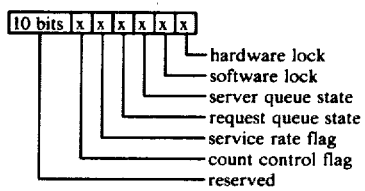

The port locks are used by the processes or processors to give one process exclusive access to the port during insertion or removal operations. The queue state flags indicate whether the associated queues are empty or occupied.

The service rate flag indicates the state of the port with respect to its deadlines (section 2.2.3). A value of zero indicates that, when the processor last dispatched a process, the deadline of that process had not passed. A value of one indicates that, when the processor last dispatched a process, the deadline of that process had passed. Software may examine this flag to determine whether the processors dispatching processes from this port are ahead of or behind schedule.

The base rights fields of a dispatching port control segment access descriptor are interpreted in the same manner as for all segments of base-type data segment. The system rights field of a dispatching port control segment access descriptor are uninterpreted.

2.2.2 Request and Service Queues

The second two double bytes of the port control segment are used to locate the request queue head and tail. The seventh and eighth double bytes of the port control segment are used to locate the server queue head and tail. The sixth double byte of the port control segment contains the count of queue elements in the request queue. The ninth double byte of the port control segment contains the count of queue elements in the server queue.

To assist software in the management of the port, two maximum count values can be maintained by the hardware during insertion operations. The count control flag indicates whether or not queue length monitoring is to be done. A value of zero indicates that queue length monitoring is to be done. A value of one indicates that queue length monitoring is not to be done. The count control flag can be used to allow performance improvements in systems where queue length monitoring is not desired or necessary. Depending on the queue, if the count control flag is not set, the appropriate maximum count field is checked and updated if necessary.

A list of free queue link records is created when the queue is initialized by software. The head of this list is a short ordinal value found in the seventh double byte of the port control segment. It contains a byte displacement to the lowest addressed byte of the first queue link record in the free list.

The location of a descriptor in the access descriptor area and its arrival order in the corresponding queue is given by a queue link record. The structure of such a record is shown at 193 in FIG. 2B.

The successor and predecessor links are short ordinals containing the byte displacement to the lowest addressed byte of a queue link record for a previously or subsequently enqueued descriptor, respectively. A zero displacement signifies that no record is linked. This only occurs in the predecessor link of the first queue link record and the successor link of the last queue link record of a queue. The queue entry field is a short ordinal specifying the access list entry number of the associated access descriptor in the access descriptor area.

2.2.3 Deadlines

The fourth double byte of a queue link record is used in a dispatching port to hold a short ordinal value called a deadline. The deadline value is determined by a nearest-deadline-first algorithm used to insert processes on the request queue at a dispatching port. Basically, the process with the nearest deadline (i.e., nearest in time) is placed at the head of the request queue. The processes on the request queue are thus ordered by increasing deadlines. A dispatching mode bit indicates whether an enqueued process may be dispatched before or only after its deadline arrives. If the bit is zero, the process may be dispatched early. Otherwise, the process may not be dispatched until its deadline arrives or is past. Processors select processes by starting at the head of the request queue, so that processes with the nearest deadlines are normally served first. When a processor encounters a queue link record in which the dispatching mode bit is set and whose deadline has not arrived, it skips that record and attempts to find a dispatchable process further down the queue. When a processor enqueues itself at a dispatching port, the value of the deadline field for the processor is zero.

Each time an access descriptor is inserted on a queue at the port, a new queue link record is removed from the free list. The access descriptor is stored at the entry specified by the queue link record, and the record is inserted in the queue in increasing deadline order. Each time an element is removed from a queue, the head queue link record specifies the location of the associated access descriptor. The head queue link is then removed from the queue and returned to the free list.

2.2.4 Preemption Ports

The port access descriptor in the second entry of a dispatching port references a preemption port to which processes that have been suspended for external reasons (e.g., period count expiration or maintenance request) are sent in the form of process object access descriptor messages, for proper rescheduling or destruction. With normal preemption for service period expiration, a preempted process will merely reenter its current dispatching port's request queue for further execution at some later time. Preemption ports are normally buffered ports where the processes are treated like any other message.

3.0 PROCESS-TO-PROCESS COMMUNICATION

Processes are capable of running and normally do run asynchronously with respect to each other. Therefore, communication between processes tends to occur asynchronously. The mechanism required to support this type of communication can be viewed as communication between potentially parallel coroutines with a queuing mechanism interposed to resolve the possible speed differentials. Buffered communication ports provide this queuing mechanism. Details of their use are described below.

3.1 PROCESS PARAMETER TRANSMISSION

Parameter passing between processes is done using the same message-based mechanism described in the above-referenced Colley, et al patent. That is, an access descriptor for the message is placed in the message entry of the current context object of the receiving process. Process creation is performed in software by simply creating the initial context for the process attaching that context to a new process object, and finally attaching that process object to a communication port to wait for a message or to a dispatching port to wait for a processor.

3.2 PROCESS RESUMPTION/SUSPENSION

There are several operators available for interprocess communication. They are:
SEND,
CONDITIONAL SEND,
WAIT TO RECEIVE,
CONDITIONAL RECEIVE
WAIT n TIME QUANTA, and
WAIT TO RECEIVE OR n TIME QUANTA.

When the SEND or CONDITIONAL SEND operators are used, the process sending the message proceeds without waiting, potentially in parallel with the process receiving the message. When the CONDITIONAL RECEIVE operator is used, the process proceeds whether a message was received or not. When the WAIT TO RECEIVE operator is used, and no message is available, the waiting process is suspended at that point and queued awaiting a message. When WAIT n TIME QUANTA is used, the process is sent to a dispatching port and guaranteed that a dispatching delay of n time quanta will pass prior to it being redispatched. When WAIT TO RECEIVE OR n TIME QUANTA is used, the process is sent to a dispatching port and guaranteed that, if it has not received a message via a specified buffered port before a dispatching delay of n time quanta passes, it will become dispatchable again.

When synchronous communication is required, a SEND operator immediately followed by a WAIT operator can be used to simulate a synchronous, interprocess call facility.

3.3 BUFFERED COMMUNICATION PORTS AND DISPATCHING PORTS

These kinds of ports are system objects used mainly for resolving the speed differences of processes and processors through queuing. The differences between buffered communication ports and dispatching ports can be characterized by the types of objects that are queued, as well as the insertion, selection, and service mechanisms employed.

3.3.1 Buffered Communication Ports

As described in section 1.2, buffered communication ports provide the essential queuing facilities for processes waiting for messages and messages waiting for processes. If a buffered communication port object access descriptor is referenced in an interprocess communication, message insertion is at the end of the message queue. Process insertion is always done at the end of the process queue. Messages and processes are always selected from the front of the associated queue. Depending upon the setting of the service mode flag in the port, after a message has been received by a process, the process is sent either to the service destination port specified by the communication port at which the process received the message or to the current service port of the process. This allows a process to be sent either to a communication port as a message for service by a software server or to a dispatching port for service by a hardware server (i.e., processor).

Besides providing these queuing facilities, another result of the use of buffered ports in interprocess communication is that the same kind of selectivity over inputs that is available to coroutines via nonbuffered ports is available to processes. An additional facility, made available by the process queuing provided by buffered ports, is the ability to support nondistinguished server processes (i.e., a homogeneous set of server processes, all of which perform the same service) at service ports.

Another use of buffered ports is for process to process exclusion over shared objects. Such exclusion can be achieved via the processes in question waiting for access, to the object over which exclusion is desired, at a buffered port behind which the object is queued as a message when it is not in the possession of any process.

The hardware maintains information to help the software monitor service load and queue space. This is controlled by the setting of the count control flag in the port. One example of this monitoring is the maintenance of maximum counts of queue depth for both messages and processes. Software, which analyzes this data and responds to faults if queue space runs out, can control the queue space available in the near future based upon the recent past. Methods of supporting medium-term service load balancing can be based upon adding nondistinguished server processes at ports where a buildup of service requests is noticed by monitoring software.

3.3.2 Dispatching Ports

As described in section 2.2, dispatching ports provide the essential queuing facilities for processors waiting for processes and processes waiting for processors. Processes are always inserted on the request queue in accordance with scheduling control data in the process object. Processor insertion is always done at the end of the processor queue. Process and processor selection is always done from the front of the associated queue. The preemption destination port to which a process is sent if it is preempted for external reasons (i.e., service period count expiration or external maintenance request) is specified by the dispatching port from which the process was last dispatched. This allows a preempted process to be sent either to a communication port as a message for service by a software server or to a dispatching port for service by a processor.

The short-term scheduling behavior of the system depends upon scheduling control data that is inserted by software into appropriate fields in port and process objects. This data tells a processor where to insert processes in queues, how long to let them run once dispatched before preemption, how many times they should cycle through the request queue before they should be sent to a software server for scheduling service, and where they should be sent next for service.

The scheduling control data used by a processor in deciding where to insert a process on a process queue at a dispatching port consists of two components in the process control segment (150), FIG. 2A. The first component is the service period of the process. This is the maximum period over which a processor will serve this process before preemption. The process may voluntarily give up the processor sooner (e.g., by executing a WAIT TO RECEIVE operator). The second component is the relative scheduling delay period of the process. This is the maximum delay that the process can absorb and still be able to complete its service period before it falls behind the schedule set for it by software. This delay is relative since it begins when the process is enqueued at a dispatching port. This relative delay, when added to the current processor timing value, forms the deadline for the process. This deadline is then used when enqueuing the process. The process is enqueued before any process with a greater deadline. When any process arrives at a dispatching port for scheduling, its service period count is examined. If this count is zero, the process is sent to the preemption port specified in the dispatching port. Otherwise, it is inserted at the dispatching port in deadline order.

The current processor timing value is maintained internally as a 16-bit counter. The processor timers of all processes in a configuration are synchronized so that a single, system-wide time standard is available. The processor timers provide 100 microsecond resolution, and up to 6.55 seconds of total time before turnover. The maximum relative scheduling delay is limited by processors to half of the time turnover period (i.e., 3.27 seconds). The minimum process service period is 100 microseconds (i.e., the resolution of the system-wide time standard). The maximum process service period is limited by processors to 3.27 seconds (i.e., a 15-bit number).

When selecting a process at a dispatching port, a processor must, prior to dispatching the process associated with a given queue link record, inspect the dispatching mode field of the given queue link record. If the dispatching mode field is not set, the associated process may be dispatched either before or after its deadline has passed. However, if the dispatching mode field is set, the associated process may not be dispatched until after its deadline has passed. In such a case, if the deadline has not passed, the processor must search further down the request queue for a queue link associated with a process which is dispatchable.

When the process is selected via dispatching, the current processor timing value is added to the process service period to form an absolute process preemption time. This time is held internally by the processor. Each time the timer is incremented, it is tested against the absolute process preemption time (presuming the processor is currently serving a process) to see if service period preemption should occur. When service period preemption occurs or the process is enqueued at a buffered port due to a voluntary wait, the process service period count is decremented by one. When service period preemption occurs, the process is reinserted, as described above, in the request queue of the dispatching port from which it was dispatched.

Process timing data is optionally maintained in the process clock field in each process control segment (150). This option is controlled by the setting of the clock mode in the process object. When a process is suspended, its process clock is updated to reflect the amount of service it received during its last service period. If the process was preempted due to expiration of its service period, the length of the service period is added to the process clock. If the process was suspended voluntarily (e.g., by executing a WAIT TO RECEIVE operator) or involuntarily (i.e., via a processor-level fault), the elapsed part of the process's service period is added to the process clock. The process clock is maintained as an ordinal value. It can thus account for 429,496.72 seconds (greater than 118 hours) of processor time based upon the 100 microsecond resolution of the system-wide time standard. If the process clock overflows, a process-level fault occurs after the process clock has been automatically reinitialized to the amount of overflow from the addition causing the fault.

Dynamic alterations to scheduling behavior are caused by software by changing the scheduling control data described above. Given the exclusion mechanisms provided for port objects and processor objects via the LOCK OBJECT and UNLOCK OBJECT operators and the process maintenance request mechanism, scheduling software can gain sole access to the appropriate objects and, as described below, alter the scheduling control data contained there to change the static scheduling behavior of the system. By maintaining data structures containing process-related information for every process in the system, software can dynamically compute the current service load. Given this information, service period, relative delay, and period count scheduling information in the process objects can be manipulated to implement most desirable scheduling policies. For example, a "round-robin" policy can be implemented by setting the delay and service periods for all processes the same. If the service period exceeds each process's processor requirement, the policy reduces to "first-come/first-served." Other policies can be implemented in similar ways. Not only can those policies be implemented easily, but they can be altered dynamically to reflect loading.

The same sorts of adaptive service load and queue space balancing that were discussed above under communication ports (section 1.2) is made possible at dispatching ports by optional hardware maintenance of the same kind of measurement data. This option is controlled by the setting of the count control flag in the port.

4.0 PROCESSR-TO-PROCESSOR COMMUNICATION

If processors queue themselves at dispatching ports, as described above, some means must be provided for signaling a queued and idle processor to reattempt the dispatching cycle when a process has become available for service. This is one of the main functions of the interprocessor communication mechanism, which is more fully described in copending patent application entitled "Interprocessor Communication System," by George W. Cox and Justin R. Rattner, application Ser. No. 972,010, filed on Dec. 21, 1978.

4.1 INTERPROCESSOR COMMUNICATION PROTOCOL

Each processor has access to two communication segments, one for system-wide communication, called the global communication segment (190, FIG. 2A), and one for processor specific communication, called the local communication area (172, FIG. 2B) of the processor control segment. Contained in each communication segment is a field containing a number of processor control flags. When set by some processor and later inspected by the associated processor, these control flags cause the inspecting processor to perform a variety of important functions. For example, the inspecting processor can be made to perform the dispatching function.

Every interprocessor communication has two phases, a request phase and an associated response phase. The request phase proceeds as follows. The communication segment to be used has its hardware request lock set. The required service count is set from the processor count found in the communication segment. The interprocessor message is stored in the control flag field, and the response lock is set. The request lock for the communication segment is unlocked. The target processor or processors are notified to inspect the appropriate communication segment via the hardware interprocessor signaling mechanism described more fully in the above-referenced Cox et al application.

The response phase proceeds as follows. A processor sets the hardware request lock for the given communication segment. Each of the processor control flags is responded to in priority order in accordance with the state of the responding processor. Upon completion of each requested function, the processor changes the state information in its processor object appropriately. This is because the current processor state determines, in some cases, what effects the processor control flags have. Next the required service count is decremented. When the required service count reaches zero, the control flag field and the response lock are cleared.

If a processor finds a communication segment locked, when attempting to access that object on its own behalf, it generates an object interlock fault.

A pair of instructions called SEND TO PROCESSOR and BROADCAST TO PROCESSORS are available to allow software access to the interprocessor communication facilities.

5.0 PROCESS COMMUNICATION OPERATORS

SEND 2 data references

SEND allows a process to send a message via a target port. The first data reference specifies a short-ordinal operand containing the segment selector for the message to be sent. The second data reference specifies a short-ordinal operand containing the segment selector for an access descriptor for the port through which the message is to be sent.

Operator execution proceeds as follows. Fetch the message segment selector. Fetch the associated access descriptor. If the access descriptor does not bear delete rights, an access descriptor deletion fault occurs. Fetch the target port segment selector. Fetch the associated access descriptor. If the access descriptor fetched is not either a dispatching port or a buffered port access descriptor, a port type fault occurs. If the access descriptor fetched does not bear send rights, a port rights fault occurs.

Replace the source message access descriptor with a null access descriptor and perform reclamation marking on the associated segment descriptor. Perform message insertion at the target port and continue execution.

WAIT TO RECEIVE 1 data reference

WAIT TO RECEIVE allows a process to wait at a buffered port for a message from some process. The data reference specifies a short-ordinal operand containing the segment selector for an access descriptor for the buffered port at which the process desires to wait to receive a message.

Operator execution proceeds as follows. Fetch the buffered port segment selector. Fetch the associated access descriptor. If the access descriptor fetched is not a buffered port access descriptor, a port type fault occurs. If the access descriptor fetched does not bear receive rights, a port rights fault occurs.

If a message is not available at the buffered port, perform process suspension at the buffered port and perform dispatching. Otherwise, perform message acceptance from the buffered port.

Check that the message entry of the current context of the current process contains a null access descriptor, and if so, continue. Otherwise, perform path count decrementation on the associated segment descriptor.

Store the received message in the message entry of the current context of the current process. Perform a selective cache flush using the destination segment selector. Continue execution.

CONDITIONAL SEND 3 data references

CONDITIONAL SEND allows a process to check for the availability of message queuing space at a target port and to indivisibly send a message to that port if queuing space is available. The first data reference specifies a short-ordinal operand containing the segment selector for the message to be sent. The second data reference specifies a short-ordinal operand containing the segment selector for an access descriptor for the port through which the message is to be sent. The third data reference specifies a boolean operand which is set to true if the message was sent.

Operator execution proceeds as follows. Fetch the message segment selector. Fetch the associated access descriptor. If the access descriptor does not bear delete rights, an access descriptor deletion fault occurs.

Fetch the target port segment selector. Fetch the associated access descriptor. If the access descriptor fetched is not either a buffered port or a dispatching port access descriptor, a port-type fault occurs. If the access descriptor fetched does not bear send rights a port rights fault occurs.

If message queue space is available, replace the source message access descriptor with a null access descriptor, perform reclamation marking on the associated segment descriptor, perform message insertion at the target port, and store true in the boolean operand. Otherwise, store false in the boolean operand. Continue execution.

CONDITIONAL RECEIVE 2 data references

CONDITIONAL RECEIVE allows a process to check for the availability of a message at a buffered port and to indivisibly accept it if one is available. The first data reference specifies a short-ordinal operand containing the segment selector for an access descriptor for the buffered port which the process desires to check for a message. The second data reference specifies a boolean operand which is set to true if a message is received.

Operator execution proceeds as follows. Fetch the buffered port segment selector. Fetch the associated access descriptor. If the access descriptor fetched is not a buffered port access descriptor, a port-type fault occurs. If the access descriptor fetched does not bear receive rights, a port rights fault occurs.

If a message is not available at the buffered port, store false in the boolean operand. Otherwise, perform message acceptance from the buffered port.

Check that the message entry of the current context of the current process contains a null access descriptor, and if so, continue. Otherwise, perform path count decrementation on the associated segment descriptor.

Store the received message in the message entry of the current context of the current process. Perform a selective cache flush using the destination segment selector. Store true in the boolean operand. Continue execution.

WAIT n TIME QUANTA 1 data reference

WAIT n TIME QUANTA allows a process to send itself to a dispatching port and be guaranteed that a dispatching delay of n time quanta will pass prior to it being redispatched. The first data reference specifies a short-ordinal operand containing the dispatching delay value. The dispatching port used is the current service port of the process.

Operator execution proceeds as follows. Fetch the current service port access descriptor from the current process object. If the descriptor fetched is not a dispatching port access descriptor, a port-type fault occurs. If the access descriptor fetched does not bear send rights, a port rights fault occurs. Fetch the dispatching delay value. Perform process suspension at the dispatching port using the dispatching delay value in deadline computation. Perform dispatching.

WAIT TO RECEIVE OR n TIME QUANTA 2 data references

WAIT TO RECEIVE OR n TIME QUANTA allows a process to send itself to a dispatching port so that it can be guaranteed that, if it has not received a message via a specified buffered port before a dispatching delay of n time quanta passes, it will become dispatchable again. The first data reference specifies a short-ordinal operand containing the dispatching delay value. The dispatching port used is the current service port of the process. The second data reference specifies a short-ordinal operand containing the segment selector for an access descriptor for the buffered port at which the process desires to wait to receive a message.

Operator execution proceeds as follows. Fetch the buffered port segment selector. Fetch the associated access descriptor. If the access descriptor fetched is not a buffered port access descriptor, a port-type fault occurs. If the access descriptor fetched does not bear receive rights, a port-rights fault occurs.

If a message is not available at the buffered port, perform process suspension at the buffered port and also send the process to the specified dispatching port as described below. Otherwise, perform message acceptance from the buffered port.

Check that the message entry of the current context of the current process contains a null access descriptor, and if so, continue. Otherwise, perform path count decrementation on the associated segment descriptor.

Store the received message in the message entry of the current context of the current process. Perform a selective cache flush using the destination segment selector. Continue execution.

Otherwise, fetch the current service port access descriptor from the current process object. If the access descriptor fetched is not a dispatching port access descriptor, a port-type fault occurs. If the access descriptor fetched does not bear send rights, a port-rights fault occurs. Fetch the dispatching delay value. Perform process suspension at the dispatching port using the dispatching delay value in deadline computation. Perform dispatching.

It will be understood from the foregoing description of the various embodiments of the invention that additional modifications and changes in form and details may be made by those skilled in the art without departing from the spirit and scope of the invention as claimed.

What is claimed is:

1. For use in a multiprocessing system wherein a number of processors share a common storage means, said storage means providing the means for storing a number of access descriptors which represent one of said processors as a processor object, one of said access descriptors (process object access descriptor) providing access to a process object for storing process object access descriptors for describing the type and the extent of access to system objects (including a buffered port system object) associated with a process to be executed on said one of said processors, a first one of said access descriptors containing information providing access to said buffered port system object, and a second one of said access descriptors (message access descriptor) representing a message as a system object; the improvement in said one of said processors comprising:

first means for registering first access information, said information providing access to said processor object stored in said storage means, said first means initially being loaded with said first access information;

second means for registering second access information, said information providing access to said buffered port object stored in said storage means;

third means for registering third access information, said information providing access to said process object stored in said storage means, said third means initially being loaded with said third access information;

control means, connected to said first, second, and third means, and to said storage means, capable of responding to an instruction of said process, for using said first access information to fetch said process object access descriptor, said control means including means for loading third-access information developed from said process object access descriptor, into said third means for registering, means for using said third access information to fetch said one of said access descriptors containing information providing access to said buffered port system object, means for loading second access information developed from said one of said access descriptors into said second means for registering, means for using said second access information to access said buffered port object, and means for moving said message access descriptor from said process object to said buffered port object;

whereby said processor provides the means for utilizing said buffered port system object for queuing said message access descriptor for a message to be paired with a process.

2. The combination in accordance with claim 1 wherein:

said storage means further provides the means for storing a dispatching port system object for dispatching of processes for execution by said one of said processors, said dispatching port system object including means for queuing processes which have been sent for execution and for queuing processors that are available to receive a process for execution thereof, one of said number of access descriptors which represent said processor as a system object being an access descriptor providing access to said dispatching port system object and wherein said one of said processors further comprises:

fourth means for registering fourth access information, said fourth access information providing access to said dispatching port system object, and, wherein said control means is connected to said fourth means, and said control means further includes means for using said fourth access information to fetch said access descriptor providing access to said dispatching port system object, and means for loading said fourth access information, developed from said access descriptor providing access to said dispatching port system object, into said fourth means for registering.

3. The combination in accordance with claim 2 further comprising means in said dispatching port object and said process object for storing scheduling control data in said dispatching port object and said process object, said data containing information about where to insert processes in queues, information indicating how long to let said processes run once dispatched before preemption, information indicating if said processes should be sent to a software server for scheduling service, and information indicating where said processes should be sent next for service.

4. The combination in accordance with claim 3 wherein said scheduling control data in said process object used by a processor in deciding where to insert a process on a process queue at a dispatching port includes:

first means for providing a manifestation of the service period of a process, said service period being the maximum period over which a processor will service said process before preemption; and second means for providing a manifestation of the relative scheduling delay period of said process, said delay period being the maximum delay that the process can absorb and still be able to complete its service period before it falls behind a predetermined schedule.

5. The combination in accordance with claim 1 wherein at least part of said buffered port is represented by an access list containing access descriptors, one of said access descriptors being a service port access descriptor for a service port.

6. The combination in accordance with claim 5 wherein said service port indicated by said service port access descriptor is another buffered port.

7. The combination in accordance with claim 5 wherein said service port indicated by said service port access descriptor is a dispatching port, said dispatching port including process queuing means for queuing processes sent from said buffered port for execution by means of said service port access descriptor, and processor queuing means for queuing processors that are available to receive said process for execution thereof.

8. The combination in accordance with claim 1 wherein at least part of said buffered port is represented by an access descriptor list, said list including:

a queue link and status access descriptor describing a queue link and status segment;

a service port access descriptor describing a service port destination for a message/process pair; and an access descriptor area access descriptor describing the location of an area for selectively holding access descriptors of waiting messages and the access descriptors of processes waiting for messages;

a queue link and status segment including means for indicating port status;

means in said queue link and status segment for maintaining a free link queue and queue link records, each record containing a pointer to one access descriptor in said access descriptor area;

means for removing an access descriptor from said access descriptor area; and means for transferring said access descriptor to the access descriptor area of the service port specified by said destination in said service port access descriptor of said buffered port object.

9. The combination in accordance with claim 1 wherein said buffered port further comprises:

a number of chained queue link records;

an access descriptor area for holding access descriptors of a message type or access descriptors of a process type;

a queue length status segment for maintaining said records, said segment having a port status field;

whereby a message to be queued or a process to be bound to a message utilize said access descriptor area to place therein an access descriptor representing a respective system object; and wherein said port status field is selectively activated to indicate the presence of queued descriptors of said message type when in a first state, and the presence of queued descriptors of a process type when in a second state.

10. The combination in accordance with claim 1 wherein at least part of said buffered port comprises:

a queue for holding access descriptors, said queue capable of being in a first state wherein it functions as a request queue for holding access descriptors of a first object type and capable of being in a second state wherein said queue functions as a server queue for holding access descriptors of a second object type;

queue status means settable to a first state and a second state to thereby indicate that said queue is functioning as a request queue or a server queue respectively; and means for inserting access descriptors into said queue, and for setting said queue status means to said first or second state, depending upon the type of access descriptor inserted into said queue, said queue status means including port locking means for ensuring one process access to said port during insertion or removal of said access descriptors.

11. The combination in accordance with claim 1 wherein the messages queued at said buffered port are in the form of access descriptors, each access descriptor containing encoded information that specifies those access rights available to a process accessing a segment associated with said access descriptor.

12. The combination in accordance with claim 1 wherein said buffered port further comprises:

queuing means for selectively acting as a request queue for holding access descriptors for messages that have been sent and a server queue for holding process object access descriptors for processes that have been suspended pending the arrival of a message; and status information means for indicating whether said queuing means is currently acting as a server queue, a request queue, or is empty.

13. The combination in accordance with claim 12 wherein said status information further comprises a self-service flag which when not set or set, selectively, causes a process queued at said port to be sent to either the service port specified in said access list or the current dispatching port as specified in said process object.

14. The combination in accordance with claim 1 wherein said process object further includes means for recording information specifying the identity of the last port used for process service, whereby said information may be updated each time an access descriptor for the process is sent to a service port.

15. The combination in accordance with claim 1 wherein said process object further includes means for recording information specifying the identity of the last buffered port used to pair said process with a message, whereby said information may be updated each time an access descriptor for the process object is enqueued at a buffered port.

16. The combination in accordance with claim 1 wherein said buffered port is a fault buffered port, said combination further comprising:

means stored in said process object for specifying said fault buffered port;

whereby whenever a process commits a fault related to access or addressability, it may be suspended and sent as a message to a maintenance process waiting at said fault buffered port to thereby repair or destroy said process.

* * * * *